United States Patent Office 3,480,952
Patented Nov. 25, 1969

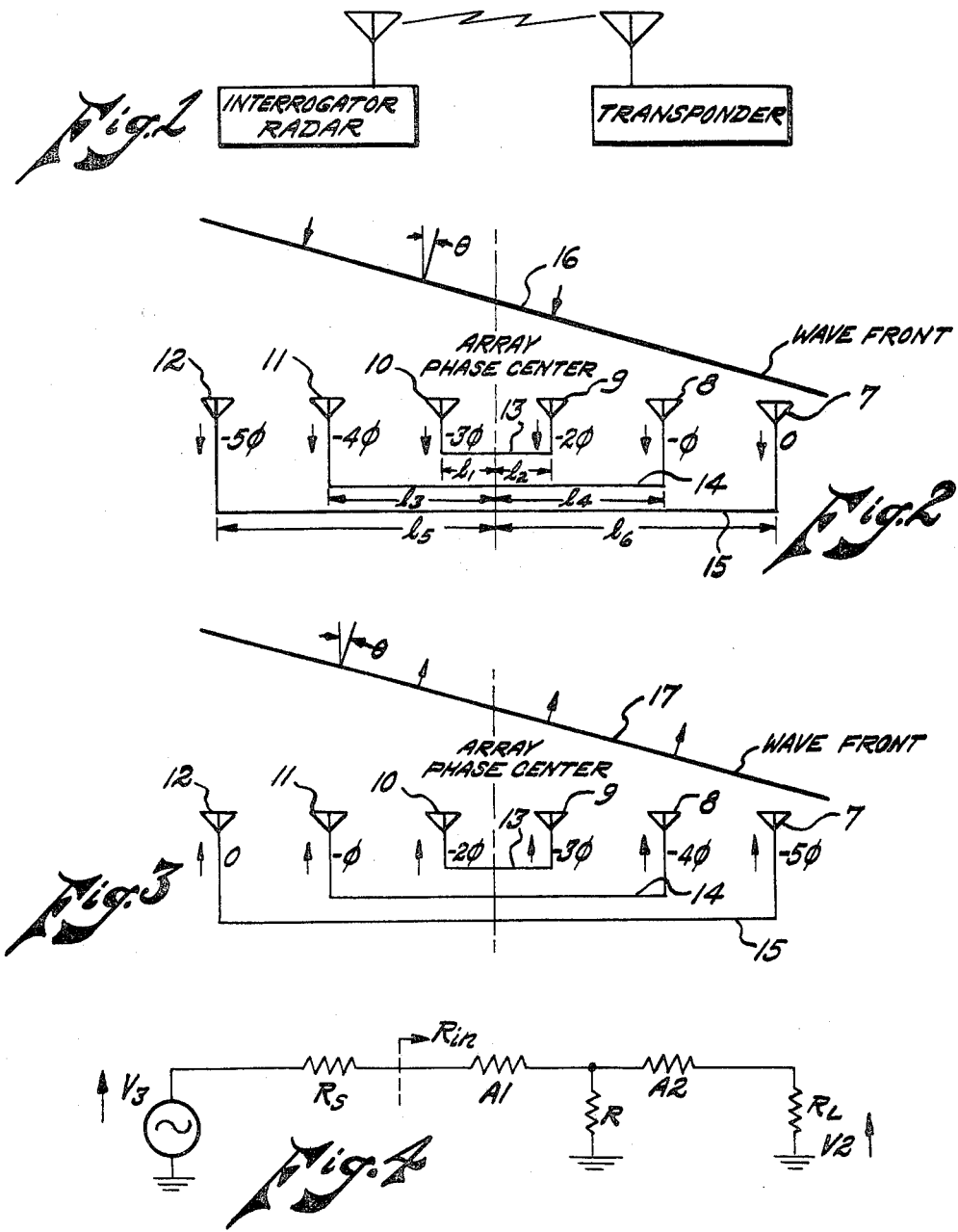

3,480,952
RADAR BEACON SYSTEM WITH TRANSPONDER FOR PRODUCING AMPLIFIED, PHASE SHIFTED RETRODIRECTED SIGNALS
Nathan Freedman, West Newton, Mass., assignor to the United States of America as represented by the Secretary of the Air Force
Filed May 15, 1968, Ser. No. 729,329
Int. Cl. G01s 9/56
U.S. Cl. 343—6.8     4 Claims

ABSTRACT OF THE DISCLOSURE

A radar beacon system including a transponder adapted to retrodirectively reradiate amplified, phase shifted signals to the system interrogator. A bidirectional negative resistance amplifier is used in combination with a retrodirective antenna array and particular switching means to provide a simplified lightweight transponder. Negative resistance bidirectional amplifiers, preferably of the tunnel diode type, are inserted into the connecting cables of conjugate radiator element pairs of a Van Atta type antenna array. Switching between different conduction levels of the tunnel diodes at a discrete frequency provides 180° phase shifting of signals as they are received by one conjugate radiator element and reradiated by other.

Background of the invention

This invention relates in general to radar beacon systems and particularly to pseudo-passive radar beacon transponders that utilize retrodirective antenna arrays.

Radar beacon systems are commonly used to enhance radar echoes from particular targets and to identify certain objects such as friendly aircraft. The system comprises an interrogator and a transponder. The interrogator can be a conventional search radar that transmits microwave signals and derives information from returned echoes. The transponder usually includes a transmitter and a receiver, receiving and transmitting antennas, and means for modulating or coding the signal to be returned. In operation, a directional signal transmitted by the interrogator is received by the transponder. The transponder, in turn, modulates the signal with an identifying code, and omnidirectionally transmits it, usually at an increased power level. The transponder then is a device that is normally quiescent or passive and in effect acts as an amplifier of radar echoes. Beacon systems may be of the ground to air, air to ground, or air to air varieties. They find particular use when echoes from a simple radar set are too weak to be observed, such as for instance those from a small airplane at a great distance. Under other circumstances strong echoes from numerous buildings, hills or mountains mask weaker echoes from targets of greater interest. Furthermore, for the benefit of aircraft carrying radar sets, it is sometimes desired to mask some particular place on the ground that gives no distinguishing echoes.

Transponder receivers, transmitters, coding equipment and power amplification circuits are generally complex, expensive, and add substantial weight to airborne units. It would therefore be desirable to reduce cost and weight and to increase reliability by simplification if the same could be accomplished without sacrifice to transponder effectiveness. It is also desirable that beacon systems incorporating such transponder have appreciable range.

A radar beacon system disclosed in my co-pending patent application Ser. No. 729,326, entitled Retrodirective Phase Shifting Transponder, filed on even date herewith, does accomplish many of these and other objectives. Such a system, however, is somewhat limited in range. The present invention is directed toward overcoming this deficiency.

Summary of the invention

The radar beacon system disclosed herein comprehends the use of a novel simplified pseudo-passive transponder. A retrodirective antenna array is utilized to redirect the received radar signal to the interrogator, thus providing maximum efficiency and returned signal strength. The Van Atta type antenna array is particularly well suited for such an application and is used in the preferred embodiment of the present invention. Such an array comprises a plurality of pairs of radiator elements wherein conjugate elements are connected by cables of equal length. An antenna thus constructed inherently reflects an incoming wave back to the transmitter station. It is capable of reflecting a wave incident at any angle from end-fire to broadside. Its gain, therefore, can be very high without requiring precise attitude stabilization.

Increased beacon system range is provided for by inserting amplifiers into the cables which connect conjugate antenna radiator elements. Signal amplification power requirements are virtually eliminated by the use of a novel bidirectional tunnel diode amplifier. Such an amplifier is described in detail in my co-pending patent application Ser. No. 729,327, entitled Bidirectional R.F. Amplifier, filed on even date herewith.

The present invention also greatly simplifies the coding equipment and substantially eliminates the modulation power requirements of the transponder. Coding is provided in beacon systems to permit positive identification by the interrogator of the returned signal. This has been accomplished in conventional beacon systems by amplitude modulation or pulsing of the received interrogator signal. The transponder comprehended herein accomplishes the same end by phase shifting the interrogating signal 180° before reradiating it to the interrogator. This is accomplished by switching the bias voltage of the tunnel diodes of each bidirectional amplifier between two levels of conduction or between conduction and nonconduction at the proper frequency to effect simultaneously the amplification of the signal and a 180° shift in its phase as it passes from one conjugate antenna element to the other.

It is a principal object of this invention to provide a new and improved radar beacon system having a pseudo-passive transponder that is capable of phase modulation and of retrodirectively reradiating signals received from an interrogator.

It is another object of the invention to provide a radar beacon system transponder having a minimum number of components.

It is another object of the invention to provide a radar beacon system transponder that is lightweight and inexpensive.

It is another object of the invention to provide a radar beacon system transponder that has improved reliability.

It is another object of the invention to provide a radar beacon system transponder having reduced signal modulating power requirements.

It is another object of the invention to provide a radar beacon system transponder comprising the combination of a Van Atta type antenna array in combination with signal phase shifting means.

It is another object of the invention to provide a radar beacon system transponder of the type described that is capable of simultaneously amplifying and phase shifting interrogating signals passing therethrough.

These, together with other objects, advantages and features of the invention will become more apparent from the following detailed description when taken in conjunction with the illustrative embodiments in the accompanying drawing.

Description of the drawings

FIGURE 1 is a block diagram illustrating the two major components of a radar beacon system;

FIGURE 2 is a schematic diagram illustrating the principle of operations of a Van Atta type antenna array with respect to a received electromagnetic wave;

FIGURE 3 is a schematic diagram illustrating the principle of operation of a Van Atta type antenna array with respect to a transmitted or reflected electromagnetic wave;

FIGURE 4 is an equivalent circuit of the bidirectional R.F. amplifier schematically illustrated in FIGURE 6;

Description of the preferred embodiments

Figure 5:
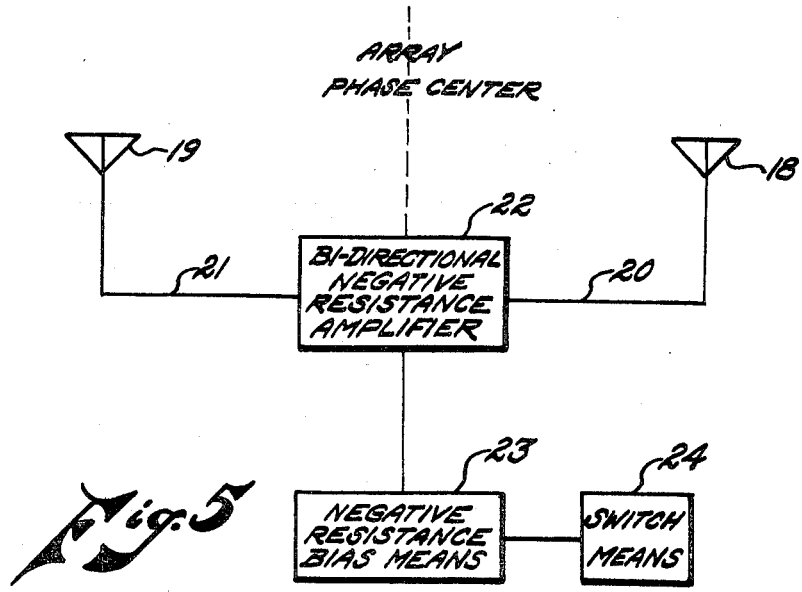
FIGURE 5 is a block diagram of one preferred embodiment of the invention.

Referring now to FIGURE 1, there is illustrated thereby the two major components of a radar beacon system. The interrogator, which for the purposes of the present invention can be any conventional radar suitable for beacon interrogation, transmits microwave signals to the transponder. The transponder of the present invention is pseudo-passive and in this respect differs from the usual state-of-the-art transponder. By pseudo-passive is meant that the received signal is not detected and processed at the transponder, but is offset in frequency and then reradiated.

The retro-directional reradiation feature of the invention is accomplished by the use of a Van Atta type antenna array. A Van Atta antenna array consists of a number of pairs of interconnected antenna radiator elements arranged to provide a large backscattering cross-section. If the location of each antenna is defined to be that of its phase center, then the phase center of each pair of radiating elements is the mid point of the line joining the phase centers of the two antenna elements comprising the pair. For effective arraying, it is required that the phase center of all pairs of radiating elements be closely coincident (within some fraction of a wavelength). Another requirement for effective arraying is that the phase lengths between antennas of all pairs be equal. In practice, this is accomplished by careful control of interconnecting cable lengths.

The manner in which such an antenna array operates can be more clearly understood from the following discussion of FIGURES 2 and 3, reference to which is now made. Antenna radiator elements 9 and 10 comprise a pair and are positioned equidistant from the array phase center by cable 13. Similarly, radiator elements 8 and 11 are a pair connected by cable 14 and elements 7 and 12 are also a pair connected by cable 15. The geometry of the array is such that cable sections $l_1=l_2$, $l_3=l_4$, and $l_5=l_6$. Equal line lengths are needed so that an equal phase delay occurs in each interconnecting cable. To understand how the array operates, consider plane wave 16 incident upon the array as illustrated in FIGURE 2. This plane wave 16 induces signals in each antenna element having the phase shown in FIGURE 2. After the energy has traveled through the equal length interconnecting cables, the relative phase of the reradiated waves are reversed as shown in FIGURE 3. A study of these FIGURES 2 and 3 shows that the relative phases of these waves are of the correct value to cause the antenna array to reradiate wave 17 back in the direction wave 16 arrived.

The scattering cross-section of such an antenna array can be derived from the expression $$\sigma = 4\pi R^2 \frac{P_R S}{P_i} \quad (1)$$

where:

$\sigma$ is the scattering cross-section $P_i$ is the power density of the plane wave incident upon the reflector, and $P_R S$ is the reflected power density at a receiver a distance R away from the reflector The power received by the antenna array is equal to the product of the effective area $A_e$ of the array and the incident power density, $P_i$. Assuming no reflective or dissipative losses in the array, all of the received power is reradiated and the reflected power density at the receiver a distance, R, from the array is $$P_R S = \frac{A_e P_i G}{4\pi R^2} \quad (2)$$

where G is the gain of the array. For any antenna, the gain and the effective area are related by $$G = 4\pi A/\lambda^2 \quad (3)$$

where $\lambda$ is the free space wavelength. The scattering cross section of the array is therefore $$\sigma = \frac{G^2 \lambda^2}{4\pi} \quad (4)$$

The basic concept of the present invention is to utilize the type of antenna array described above as a radar beacon system transponder. This is accomplished by the novel combination of a negative resistance bidirectional R.F. amplifier, means for switching it so as to phase modulate received signals, and the retrodirective antenna array described above. In essence, a 180° phase shift is switched in and out of the cables connecting conjugate pairs of the antenna radiating elements by means of controlling bias on the tunnel diodes of the amplifiers. Such switching is done at the desired offsetting frequency.

Referring now to FIGURE 5, there is illustrated a block diagram of the novel combination which comprises the transponder of this invention. Antenna radiator elements 18 and 19 are conjugate elements of an antenna pair positioned equidistant from the array phase center by equal length cables 20 and 21. A bidirectional negative resistance amplifier 22 is connected into the antenna circuit as shown and negative resistance bias means 23 and switching means 24 are arranged in combination with the negative resistance amplifier to effect appropriate switching thereof. Only a single pair of antenna radiator elements are disclosed for simplicity of illustration. It is to be understood, however, that a multiplicity of pairs may be used in actual practice and the same are comprehended within the scope of the invention.

Figure 6:
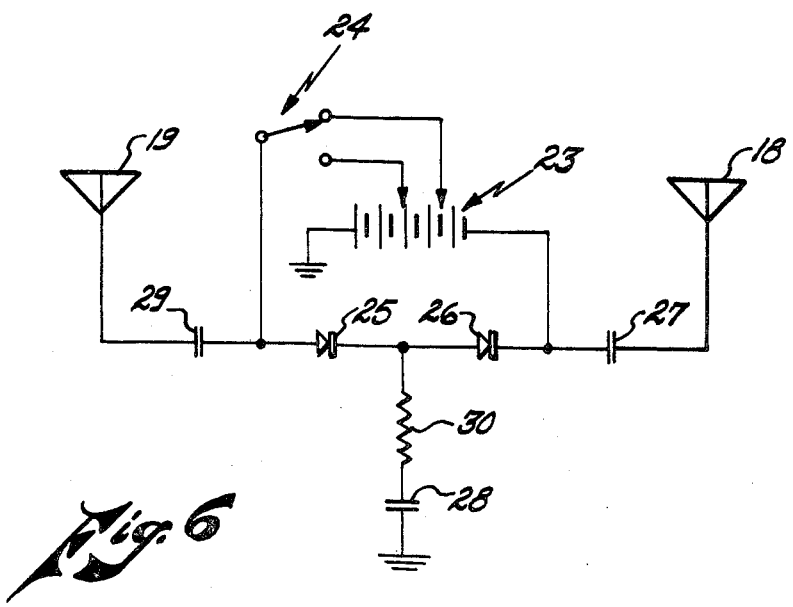
FIGURE 6 is a schematic diagram of the embodiment of the invention illustrated in FIGURE 5.

The schematic diagram of FIGURE 6 illustrates in further detail the embodiment of the invention disclosed in FIGURE 5. The bidirectional negative resistance amplifier 22 is thus shown to comprise the circuit including tunnel diodes 25 and 26 and resistor 30. Tunnel diodes 25 and 26 are connected in series relationship between antenna radiator elements 18 and 19. Resistor 30 is connected between the junction of tunnel diodes 25, 26 and ground. Battery 23 provides the forward bias for the tunnel diodes. Capacitors 27, 28 and 29 provide D.C. isolation for the circuit.

The relationships between the resistance value of resistor 30 and the negative resistance values of tunnel diodes 25 and 26 are derived using the equivalent circuit of FIGURE 4, reference to which is now made. In these derivations, all impedances are normalized with respect to the characteristic impedance of the connected source and load. The connected source and load are assumed to be equal. Having particular reference to FIGURE 4 $R_s$ and $R_L$ represent input and output impedances respectively and are taken as unity. Resistance R is the resistance of resistor 30 in FIGURE 5. $V_3$ and $V_2$ represent signals from antenna elements 18 and 19 having direction of travel represented by the adjacent arrows. $A_1$ and $A_2$ represent the negative resistance values of tunnel diodes 25 and 26 respectively and are assumed to be equal.

The voltage gain of the equivalent circuit of FIGURE 4, designated M, is defined as $2V_2/V_3$ and will be unity when the source is connected directly to the load. For any values of A ($A_1$ and $A_2$ being equal, A is hereinafter used to designate the value of either) and R therefore $$M = \frac{2R}{(1+A)(1+A+2R)} \qquad (5)$$

The input impedance $R_{in}$ is, therefore, represented by $$R_{in} = A + \frac{R(1+A)}{1+A+R} \qquad (6)$$

For the matched condition $R_{in}=1$ $$A^2 + 2AR = 1 \qquad (7)$$

or $$R = \frac{1-A^2}{2A} \qquad (8)$$

and $$M = \frac{1-A}{1+A} \qquad (9)$$

Accordingly, there will be gain when $|M|>1$. This will be true only if $A<0$. Assuming this, there are two cases to consider:

(1) when $|A|<1$, $R<0$; and all resistances are negative and,
(2) when $|A|>1$, $R>0$; and only A is negative.

In order to minimize the number of diodes required, condition (2) is preferred.

By way of notation, the negative of a quantity is designated by a bar; that is, $\overline{A} = -1$ and $\overline{M} = -M$.
Consequently:

$$\overline{M} = \frac{\overline{A}+1}{\overline{A}-1} = \frac{R}{\sqrt{R^2+1}-1} \qquad (10)$$

$$\overline{A} = \frac{\overline{M}+1}{\overline{M}-1} \qquad (11)$$

and $$R = \frac{\overline{A}^2-1}{2\overline{A}} \qquad (12)$$

Equation 12 represents the desired relationship between the resistance value of resistor R and the negative resistance values of tunnel diodes D1 and D2.

In accordance with the basic concept of the invention, the bidirectional negative resistance amplifier comprising diodes 25, 26 and resistor 30 above described, is periodically switched between conducting and non-conducting states or between two diode bias levels at a frequency suitable to phase shift signals passing therethrough in either direction by 180°. This is accomplished by bias voltage source 23 and switching means 24. Switching means 24 can be any conventional switching device capable of switching between the two bias levels at the appropriate frequency.

In order to switch the bidirectional amplifier directly at the proper modulating frequency, it is necessary to eliminate reflected energy at the input. $R_{in}$, therefore, shown equal 1 for both switched states of the amplifier. This can only be true if A is switched. Solving Equation 7 above for the two permitted values of A:

$A_1 = -\sqrt{R^2+1} - R = -\overline{A}$, the value producing gain $$M_1 = -\overline{M}$$

$A_2 = +\sqrt{R^2+1} - R$, producing gain $$M_2 = \frac{R}{\sqrt{R^2+1}+1} \qquad (13)$$

A quantity called the peak modulation can be defined as $\Delta = M_2 - M_1 = M_2 + \overline{M}$ which is a measure of the algebraic difference in the gain in the two states. It can be shown that the sideband gain $G_s$ is:

$$G_s = \frac{\Delta}{\pi}$$

For this case, $$G_s = \frac{\Delta}{\pi} = \frac{1}{\pi}(M_2\overline{M}) = \left(\frac{2}{\pi}\right)\left(\frac{\overline{A}^2+1}{\overline{A}^2-1}\right) \qquad (14)$$

It is possible to switch from $A_1$ to $A_2$ by switching between two bias levels on the tunnel diode.

It is actually not necessary that $R_{in}=1$ in both switched states; it is sufficient, to avoid reradiation from the input of sideband energy, that $R_{in}$ be the *same* in both switched states. The energy reflected back will then only be at the carrier frequency.

In this case, the permitted values of A are:

$$A_1 = \mu - R - 1 - \sqrt{R^2 + \mu^2} \qquad (15)$$

$$A_2 = \mu - R - 1 + \sqrt{R^2 + \mu^2} \qquad (16)$$

Where $$\mu = \frac{1+R_{in}}{2}$$

for $R_{in}=0$ (short circuited input), $\mu=\frac{1}{2}$
$R_{in}=1$ (match), $\mu=1$
$R_{in}=\infty$ (open circuit), $\mu=\infty$
$R_{in}=1$ (instability), $\mu=0$ Values of $A_1$ and $A_2$ may be chosen more freely in this instance, and still obtain useful gain. An interesting special case occurs when $R_{in}=\infty$, $\mu=\infty$.
Then, $$A_2 = \infty$$
$$A_1 = -(R+1) = -\overline{A}$$
$$R = \overline{A} - 1$$

$$\overline{M}_1 = \frac{2}{\overline{A}-1}$$

$$M_2 = 0$$

$$G_s = \left(\frac{2}{\pi}\right)\left(\frac{1}{\overline{A}-1}\right)$$

By way of example, for the case $\overline{M}=2$, $A_1$ and $A_2$ each equal $-2$, R equals 1 and $R_s$ and $R_L$ also equal 1. It can be seen that the input impedance is infinite independent of whether the tunnel diodes are biased on or off. When the diodes bias on, the forward gain is, of course, zero; with the diodes biased off, $2v_2/v_s$ is $-2$.

Although the present invention has been described with reference to specific embodiments thereof, it is not intended that the same should be taken in a limiting sense. For instance, other bidirectional amplifiers suitable for microwave switching could also be used as might other embodiments of the retrodirective antenna array herein described.

Accordingly, it is understood that the scope of the invention in its broader aspect is to be defined by the appended claims only and no limitation is to be inferred from definitive language used in describing certain preferred embodiments.

What is claimed is:
1. A radar beacon system having an interrogator adapted to transmit and receive microwave signals and a remotely located transponder, said transponder comprising a retrodirective antenna array, said antenna array being adapted to receive and retrodirectively reradiate signals received from said interrogator, means for amplifying said received signals, and means for phase shifting said received signals prior to reradiation thereof, said antenna array comprising at least one pair of antenna radiator elements, and electrical conductor means, conjugate radiator elements of radiator pairs being electrically connected by said conductor means equidistant from the array center, said means for amplifying received signals comprising a bidirectional R.F. negative resistance amplifier disposed in each said electrical conductor means, and said bidirectional R.F. negative resistance amplifier comprising first and second negative resistance devices being connected in series relationship between conjugate antenna radiator elements and resistance means, said resistance means being connected between the junction of said first and second negative resistance devices and ground.

2. A radar beacon system as defined in claim 1 wherein said means for phase shifting said received signals comprises biasing means, said biasing means being adapted to bias said negative resistance devices to two levels of conduction, and switching means, said switching means being adapted to periodically switch said biasing means between said two levels of conduction at a discrete frequency.

3. A radar beacon system as defined in claim 2 wherein said bidirectional R.F. negative resistance amplifier has an input resistance equal to unity for each level of conduction.

4. A radar beacon system as defined in claim 3 wherein said bidirectional R.F. negative resistance amplifier has equal input resistance for each level of conduction.

References Cited

UNITED STATES PATENTS

| | | | |
|---|---|---|---|
| 3,196,438 | 7/1965 | Kompfner | 343—100 |
| 3,267,462 | 8/1966 | Gabriel | 343—6.8 |
| 3,299,424 | 1/1967 | Vinding | 343—6.8 X |
| 3,314,067 | 4/1967 | Rutz. | |
| 3,373,425 | 3/1968 | Barischoff | 343—6.8 |

OTHER REFERENCES

"Technique for Amplitude Modulating a Van Atta Radar Reflector," by L. H. Bauer, Proceedings of the IRE, March 1961, vol. 49, No. 2, pp. 634–635.

RODNEY D. BENNETT, JR., Primary Examiner

M. F. HUBLER, Assistant Examiner

U.S. Cl. X.R.
343—100